(12) United States Patent
Raman et al.

(10) Patent No.: US 9,785,972 B2
(45) Date of Patent: Oct. 10, 2017

(54) CONTENT DELIVERY USING SOCIAL AFFINE TARGETING

(75) Inventors: Madhusudan Raman, Sherborn, MA (US); Renu Chipalkatti, Lexington, MA (US); Jeffrey M. Getchius, Cambridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 706 days.

(21) Appl. No.: 13/292,383

(22) Filed: Nov. 9, 2011

(65) Prior Publication Data
US 2013/0117121 A1 May 9, 2013

(51) Int. Cl.
*G06Q 30/02* (2012.01)
*G09F 27/00* (2006.01)

(52) U.S. Cl.
CPC ..... *G06Q 30/0261* (2013.01); *G06Q 30/0267* (2013.01); *G06Q 30/0269* (2013.01); *G09F 27/00* (2013.01)

(58) Field of Classification Search
CPC ............. G06Q 30/0261; G06Q 30/0269
USPC .................................... 705/14.66
See application file for complete search history.

(56) References Cited

U.S. PATENT DOCUMENTS

| 2002/0077896 | A1* | 6/2002 | Liu et al. .................. 705/14 |
| 2008/0004953 | A1* | 1/2008 | Ma et al. .................. 705/14 |
| 2008/0189169 | A1* | 8/2008 | Turpin et al. ............. 705/10 |
| 2011/0035282 | A1* | 2/2011 | Spatscheck et al. ..... 705/14.58 |
| 2012/0054028 | A1* | 3/2012 | Tengler et al. .......... 705/14.49 |
| 2012/0229909 | A1* | 9/2012 | Clavin et al. ............ 359/630 |

OTHER PUBLICATIONS

R. Shannon, M. Stabeler, A. Quigley, and P. Nixon. Profiling and targeting opportunities in pervasive advertising. In 1st Workshop on Pervasive Advertising at Pervasive Conference 2009, 2009 [Google Scholar].*

* cited by examiner

*Primary Examiner* — Andre Boyce

(57) ABSTRACT

A content delivery system using social affine targeting may include a device that determines, based on presence information received from mobile devices, users in a vicinity of an electronic billboard. The device may further determine, based on user behavior information relating to the users, affinities of the users; and determine commonality of the affinities of the users. Still further, the device may select, based on the determined commonality of the affinities, one or more advertisements to present by the electronic billboard; and transmit the selected one or more advertisements to the electronic billboard.

20 Claims, 7 Drawing Sheets

CONTENT DELIVERY USING SOCIAL AFFINE TARGETING

BACKGROUND

Content, such as advertisements, may be presented on electronic devices, such as electronic billboards, that are located in public locations. Electronic billboards may be placed in, for example, airports, hotels, or merchant premises. One advantage of an electronic billboard, relative to a traditional printed billboard, is that the advertisements presented on the electronic billboard can be easily changed. For electronic billboards connected to a network, such as through a wireless cellular connection, advertisements can be downloaded and/or changed, on the electronic billboard, as desired by the advertisement provider.

When presenting advertisements, or other content, on electronic devices, such as electronic billboards, it may be desirable to effectively present advertisements to users.

DETAILED DESCRIPTION OF PREFERRED EMBODIMENTS

The following detailed description refers to the accompanying drawings. The same reference numbers in different drawings may identify the same or similar elements.

Systems and/or methods described herein may provide for the delivery of content (e.g., video, audio, or textual content), which is estimated to appeal to the largest set of users, to a particular electronic device. In one implementation, the content may be advertisements provided via electronic billboards. Users may be consensually monitored to obtain behavior information about the users, such as their content viewing habits, mobile roaming patterns, purchase history, and web browsing history. The obtained information may be analyzed to generate affinity groups that each include a set of categories that model affinities or preferences of the users. Each user may be associated with one or more affinity groups.

The affinity groups, corresponding to a group of users in the vicinity of an electronic billboard, may be combined, and the combined affinity group may be matched to one or more content items, such as advertisements. In this way, an optimal set of advertisements may be selected for presentation to the users.

Figure 1:
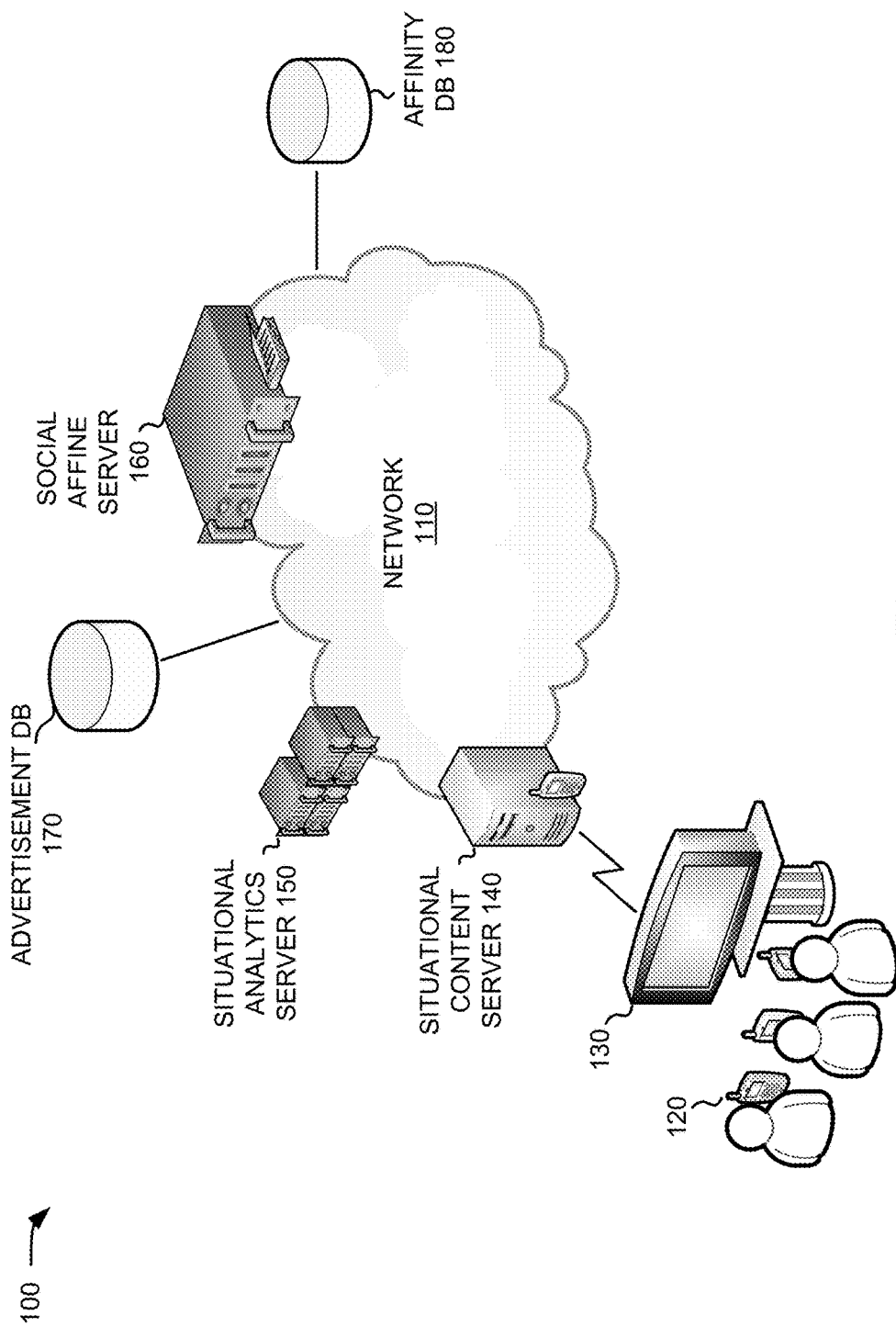
FIG. 1 is a diagram of an example environment in which systems and/or methods described herein may be implemented.

FIG. 1 is a diagram of an example environment 100 in which systems and/or methods described herein may be implemented. As illustrated, environment 100 may include a network 110 that connects a number of devices. Environment 100 may additionally include a number of users associated with mobile devices 120, which may, at various times, cluster around or be in the vicinity of an electronic billboard 130. Mobile devices 120 and electronic billboard 130 may include network connectivity, such as wireless connectivity to network 110.

Mobile devices 120 and/or electronic billboard 130 may obtain data and/or services from one or more server devices connected to network 110. As shown, the server devices may include situational content server 140, situational analytics server 150, and social affine server 160. Servers 140, 150, and 160, may operate based on data stored in one or more databases, such as advertisement database (DB) 170 and affinity database 180.

Network 110 may include a local area network (LAN), a wide area network (WAN), a metropolitan area network (MAN), an intranet, the Internet, an optical fiber (or fiber optic)-based network, a cellular network, or a combination of networks. Although a single network 110 is illustrated in FIG. 1, network 110 may generally represent a number of types of networks. In one implementation, network 110 may include a cellular network to provide wireless cellular connectivity to mobile devices 120 and/or electronic billboard 130, and a packet-based data network, such as an Internet Protocol (IP) network, to provide connectivity to servers 140, 150, and 160, and to databases 170 and 180. Network devices, such as gateways, may connect the cellular network and the packet-based data network.

Mobile devices 120 may include portable computing and communication devices, such as a personal digital assistant (PDA), a smart phone, a cellular phone, a laptop with an integrated connectivity to a cellular wireless network, etc. Mobile devices 120 may connect, through a radio link, to network 130. Mobile devices 120 may transmit presence information to network 110. The presence information may convey location information relating to a mobile device 120. For example, mobile device 120 may be able to obtain the geographic location of mobile device 120 through global positioning system (GPS) logic or positioning based on triangulation of cellular towers in network 110.

Electronic billboard 130 may be designed to present content to one or more users of mobile devices 120. Electronic billboard 130 may include, for example, a personal computer, television, or other device that includes a display or another output device (e.g., a speaker). Electronic billboard 130 may connect to network 110 through a wireless or wired connection. In general, an "electronic billboard" may broadly refer to any electronic device designed to present information, either visually and/or audibly, to one or more users. In one implementation, electronic billboard 130 may be used to present advertisements to users. Electronic billboard 130 may be placed, for example, in a public corridor in an airport or mall, in a store, in a restaurant, at a convention center, on the side of the road, or at another location that may tend to have a high level of user traffic.

Situational content server 140 may generally operate to manage advertisements displayed on electronic billboard 130 by determining advertisements (content) to present based on the current state of electronic billboard 130 and the users of mobile devices 120. Situational content server 140 may include logic to perform functions relating to keeping track of the presence or state of mobile devices 120 and electronic billboard 130. Based on the presence information of mobile devices 120 and electronic billboard 130, situational content server 140 may determine appropriate advertisements to transmit to electronic billboard 130, for presentation to the users in the vicinity of electronic billboard 130. Ideally, situational content server 140 may determine advertisements that are most relevant, or that maximize the effectiveness/yield of the advertisements, as displayed to the current group of users in the vicinity of electronic billboard 130. The preferences or affinities of the current group of users in the vicinity of electronic billboard 130 may change on different days or even throughout the course of a single day. Situational content server 140 may react to these changing preferences/affinities by, for example, providing different advertisements to electronic billboard 130.

Situational analytics server 150 may generally operate to analyze user behavior information, presence information, and/or user preference information to determine models used to measure the affinities of a user. Situational analytics server 150 may receive or track user behavior information, such as consensually obtained information (e.g., through opt-in monitoring). The behavior information may include, for example, passively monitored information, such as content viewing habits of a user, roaming patterns of a mobile device 120 of the user, purchase history of the user, web browsing interests of the user, etc. Other information, such as preferences explicitly provided by a user or demographic information provided by a user, may also be received or tracked by situational analytics server 150.

In one implementation, the passively monitored behavior information may be stored in an anonymous manner. For example, behavior information may be tracked and stored but associated with anonymous user identifiers. The monitored behavior information may be used to determine affinities of users. For example, assume the behavioral information for a particular user indicates that the user boarded a commuter train at 8 am, was relatively stationary in an office building from 9 am to noon, and visited a high-end Italian food restaurant from noon to 1 pm. This behavior information may be used to infer that the user is an affluent professional worker that enjoys Italian food. In this case, the user may have affinities for categories such as "Italian food," "apartments in city" (based on the potential inference that the user does not enjoy the long commute), and "luxury shopping" (based on the inference that the user is affluent).

Social affine server 160 may generally operate to generate affine groups based on the behavior information, and potentially based on other user information, as monitored by situational analytics server 150. An "affine group", as used herein, may represent a set of categories that model affinities of users. An affine group may be thought of as an affinity profile for a user or group of users. Each category may be represented by, for example, a word or phrase that serves as a tag for the category. The categories may include, for example, "Italian food," "shoes," "apartments in city," "shopping," "jewelry," etc. The categories may be manually entered by a designer and/or automatically determined based on an analysis of content, such as document text, advertisement text, meta-data associated with advertisements (such as content tags supplied by a creator of an advertisement), etc.

Social affine server 160 may generate a quantity of affine groups, where each affine group may represent a set of categories and a corresponding value for each category. The value may represent a score that determines the prominence of the corresponding category in the affine group. Each affine group may, thus, be represented by a vector that represents a set of categories and scores for each of the categories. The affine groups may be automatically determined from the user behavioral data (e.g., as obtained from situational analytics server 150) and each may represent a number of users that have common affinities. For example, one affine group may tend to apply to single parents, living in urban environments, and that enjoy sports. The determined set of affine groups, and the values in the affine groups, may be refined by social affine server 160 based on ongoing analysis of the user behavioral information. In one implementation, social affine server 160 may use neural network techniques, clustering techniques, or other techniques to generate the affine groups.

Social affine server 160 may also determine, for each user, an affine group or groups that should be associated with the user. The association of the user with an affine group may be performed based on the behavioral information for the user. In some implementations, the affine group associated with a user may change based on factors, such as the time of day, day of the week, or location of a user. For example, a first affine group may be most relevant to the user when the user is at work and a second affine group may be most relevant to the user on the weekends. As another example, a user's affinities, and hence the most relevant affine group for the user, may change based on the time of day (e.g., a user may be in a different mood or have different product affinities while at work than when at a sporting event).

Advertisement database 170 may store advertisements (or other content) for presentation to users on electronic billboard 130. Each advertisement may be associated with one or more categories that define the relevance of the advertisement to users. In one implementation, advertisement categories may initially be manually defined by the advertisement creator. The advertisement categories may be expanded or modified by social affine server 160 based on, for example, text (or audio) associated with an advertisement, user feedback for an advertisement, or other factors. Social affine server 160 may, for example, map an initial, relatively small, set of categories, for an advertisement, to a larger set of categories, such as the set of categories used by social affine server 160 in defining the affinity groups.

Affinity database 180 may store the consensually obtained behavioral information, or other consensually obtained information, relating to the users of mobile devices 120. Affinity database 180 may also store the affinity groups determined by social affine server 160. Social affine server 160 may access affinity database 180 to obtain the behavioral information for analysis, analyze the behavioral information to determine the affinity groups, and store the affinity groups in affinity database 180. The association of users to affinity groups may also be stored in affinity database 180.

The term database, in the context of advertisement database 170 and affinity database 180, may generally be interpreted to mean any database, file structure, or other structure that may store and/or maintain data.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more tasks described as being performed by one or more other components of environment 100. For example, the functions described as being performed by servers 140, 150, and 160, respectively, may be performed by other ones of servers 140, 150, and 160, or by other servers or devices.

Figure 2:
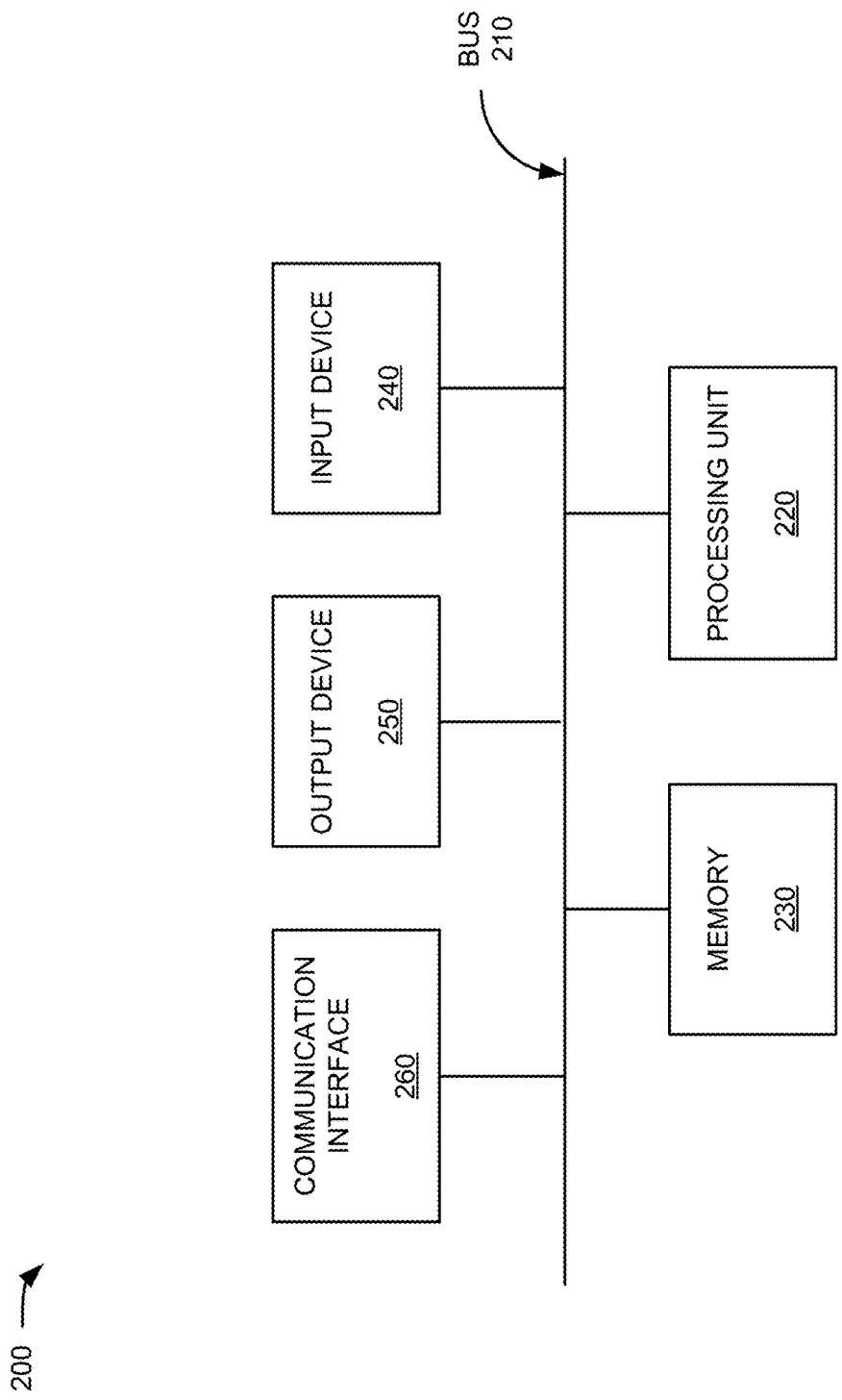
FIG. 2 is a diagram of example components of a device that may correspond to one or more devices of the environment of FIG. 1.

FIG. 2 is a diagram of example components of a device 200 that may correspond to one or more devices of environment 100, such as one of servers 140, 150, or 16, one of databases 170 or 180, or electronic billboard 130. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more Application Specific Integrated Circuits (ASICs), Field Programmable Gate Arrays (FPGAs), or the like.

Memory 230 may include a random access memory (RAM) or another type of dynamic storage device that stores information and instructions for execution by processing unit 220, a read-only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices associated with network 110.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more tasks described as being performed by one or more other components of device 200.

Figure 3:
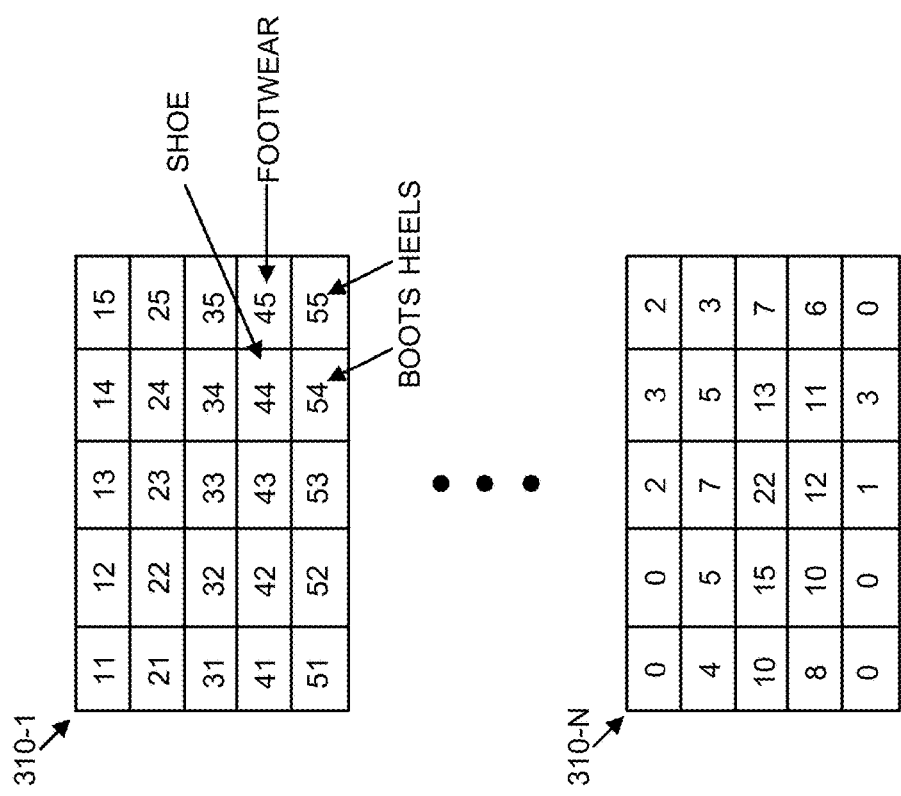
FIG. 3 is a diagram conceptually illustrating an example of affine groups.

FIG. 3 is a diagram conceptually illustrating an example of affine groups. As previously mentioned, social affine server 160 may generate affine groups based on an automatic analysis of tracked user behavior information of a large number of users, where each affine group may model a particular set of user affinities.

Affine groups 310-1 through 310-N (referred to collectively as "affine groups 310" or individually as "affine group 310") are illustrated in FIG. 3. In the illustration of FIG. 3, each affine group 310 may be represented by a two dimensional vector (illustrated in FIG. 3 as a two-dimensional array), where each cell in the vector may represent a particular category and the value for each cell may be a score that represents the prominence of the corresponding category in the affine group. In one implementation, higher scores may generally imply that the underlying category is more relevant to the affine group. For instance, a high score for a "shoe" category may represent user interest in shoes. The categories in an affine group 310 may also be related by adjacency to one another. Thus, for example, the eight categories surrounding the "shoe" category may be related to shoes, such as the categories: "footwear," "boots," and "heels." Categories even farther away from the "shoe" category (such as a category that is two cells away from the "shoe" category), may be related to the "shoe" category, but less related than the adjacent cells to the "shoe" category.

Example category tags are illustrated for four cells in affine group 310-1. The example categories are illustrated as the "shoe," "footwear," "boots," and "heels" categories, which have values of 44, 45, 54, and 55, respectively.

Although 5×5 arrays are shown in FIG. 3 as corresponding to an affine group 310, in practice, each affine group 310 may be significantly larger, such as an affine group containing thousands of cells.

Figure 4:
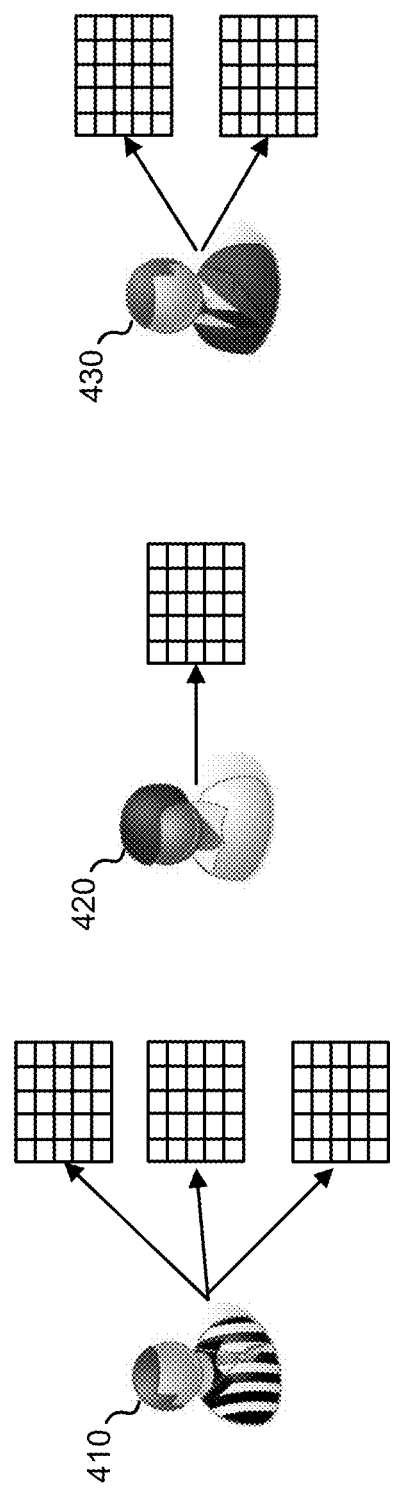
FIG. 4 is a diagram conceptually illustrating an example of the association of affine groups to users.

FIG. 4 is a diagram conceptually illustrating an example of the association of affine groups to users. Based on user behavior information for a particular user, social affine server 160 may determine one or more affine groups that apply, with a particular probability, to the particular user. For example, social affine server 160 may match the user behavior information, of the particular user, to affine groups 310 to obtain a set of affine groups that are relevant to the particular user. The determination of the affine groups that apply to the particular user may be based on, for example, neural net matching techniques or other techniques.

In FIG. 4, three example users, labeled as user 410, 420, 430, may each be associated with one or more affine groups. As shown, user 410 may be associated with three affine groups, user 420 may be associated with one affine group, and user 430 may be associated with two affine groups. The affine groups associated with a particular user may be updated based on new user behavior information and may change throughout the day. For example, based on the current context (e.g., the location or activity of the user), one of the user's affine groups may be more relevant than the others.

Figure 5:
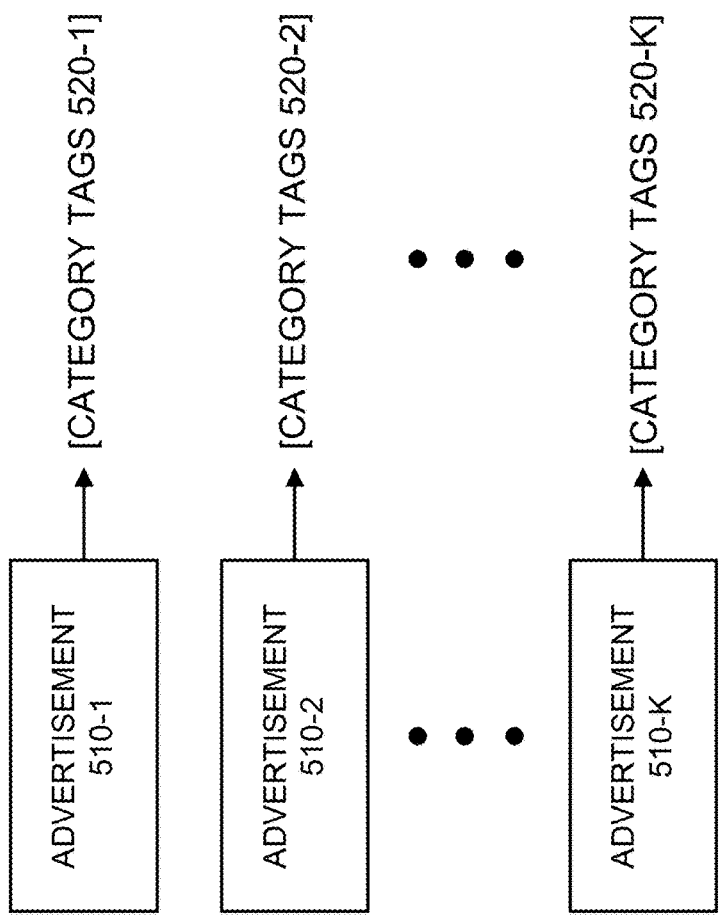
FIG. 5 is a diagram conceptually illustrating an example of advertisements.

FIG. 5 is a diagram conceptually illustrating an example of advertisements. The advertisements may be stored by, for example, advertisement database 170.

As shown in FIG. 5, a quantity of advertisements 510-1 through 510-K (referred to collectively as "advertisements 510" or individually as "advertisement 510") may be included in advertisement database 170. Each advertisement 510 may include, for example, a textual, graphical, audio, or video advertisement, which is designed to be presented on electronic billboard 130. Each advertisement 510 may also be associated with a set of category tags 520-1 through 520-K (referred to collectively as "sets of category tags 520" or individually as "set of category tags 520"). Each set of category tags 520 may represent one or more categories, such as categories represented by words or phrases. The categories may be similar to the categories, as discussed above, with respect to the affine groups. The categories may include, for example, "Italian food," "shoes," "apartments in city," "shopping," "jewelry," "men," etc. The initial categories, for a set of category tags 520, may be assigned by a creator of the advertisement or another party. In some implementations, social affine server 160 may remap the initial set of category tags, for an advertisement 510, to a set of category tags 520 used in affine groups 310. The remapping may be based on, for example, the initial set of categories, text associated with advertisements 510, or feedback from users of mobile devices 120 about a particular advertisement 510.

Figure 6:
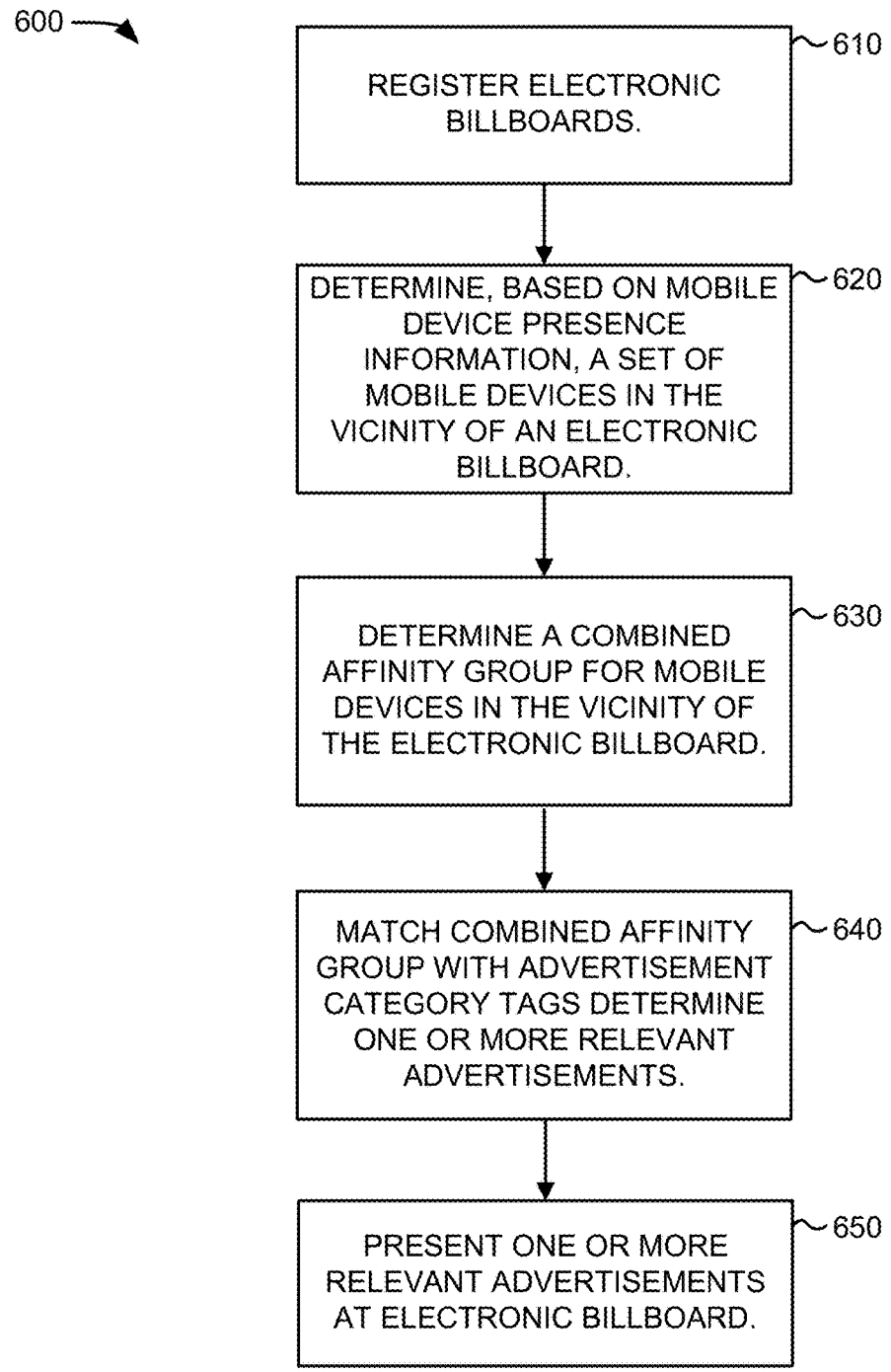
FIG. 6 is a flow chart illustrating an example process for performing delivery of content using social affine targeting.

FIG. 6 is a flow chart illustrating an example process 600 for delivery of content, such as advertisements, using social affine targeting. In one implementation, process 600 may be performed by the network devices in environment 100, including situational content server 140, situational analytics server 150, and/or social affine server 160. In another implementation, some or all of process 600 may be performed by another device or group of devices, including or excluding situational content server 140, situational analytics server 150, and/or social affine server 160.

Process 600 may include registering an electronic billboard, such as electronic billboard 130 (block 610). Electronic billboard 130 may be connected to network 110. When electronic billboard 130 is enabled to present advertisements, such as whenever electronic billboard 130 is powered-on, electronic billboard 130 may send a registration message to network 110. In one implementation, the registration message may be received and processed by situational content server 140. The registration message may include information relating to electronic billboard 130, such as, for example, the geographical location of electronic billboard 130 and/or capabilities of electronic billboard 130 (e.g., the size of the screen of electronic billboard 130, whether electronic billboard 130 is capable of producing audio, or other information relating to the ability of electronic billboard 130 to present advertisements to users).

As previously mentioned, mobile devices 120 may provide presence information to network 110, such as the geographic locations of mobile devices 120. The presence information may be tracked by, for example, situational analytics server 150. Process 600 may further include determining, based on the presence information of mobile devices 120, a set of mobile devices in the vicinity of electronic billboard 130 (block 620). The term "vicinity" may generally referred to a geographic area around electronic billboard 130 in which users in the area have a reasonable chance of viewing (and/or hearing) electronic billboard 130. For example, for an electronic billboard 130 in a store, the vicinity of electronic billboard 130 may include mobile devices 120 that are in the store or are in a part of the store near electronic billboard 130. For other electronic billboards 130, such as an outdoor electronic billboard 130, the vicinity of electronic billboard may include mobile devices 120 that are within a certain distance of electronic billboard 130.

Process 600 may further include determining a combined affine group for the mobile devices in the vicinity of electronic billboard 130 (block 630). The combined affine group may generally represent commonality of affinities corresponding to the mobile devices in the vicinity of electronic billboard 130. In one implementation, the combined affine group may be determined, by situational content server 140, based on the affine group or groups associated with the users of mobile devices 120 in the vicinity of electronic billboard 130. Situational content server 140 may combine multiple affine groups by, for example, multiplying the multiple affine groups or using linear maximization techniques to combine the affine groups.

In some implementations, the combined affine group may be determined using a weighted combining technique in which affine groups for users that are closer to electronic billboard 130 may be given more weight than affine groups for users that are farther away. In another implementation, the affine groups for some users may be weighted differently based on the behavior of users. For example, the affine groups corresponding to users that have spent a lot of time in front of electronic billboard 130 or to users that have a history of responding to digital advertisements, may be weighted more than for other users.

Process 600 may further include matching the combined affine group with a set of category tags 520, for a group of advertisements 510, to determine one or more relevant advertisements (block 640). In one implementation, situational content server 140 and/or situational analytics server 150 may sum the score of each category in the combined affine group that matches a category in the set of category tags 520, for a particular advertisement 510. One or more of advertisements 510, which correspond to the highest summed scores, may then be determined as the one or more relevant advertisements 510. In alternative implementations, other techniques may be used to match the combined affine group to obtain relevant advertisements, such as neural network techniques, linear maximization techniques, etc. In general, the techniques used in block 640 may identify, over the entire set of users in the vicinity of electronic billboard 130, one or more advertisements that maximize the affinity probability for these users.

In some implementations, instead of determining a combined affine group and matching the combined affine group with sets of advertisement category tags 520, the affine group or groups associated with the users of mobile devices 120, in the vicinity of electronic billboard 130, may be directly matched to the sets of category tags 520. In other implementations, to enable real-time determination of relevant advertisements, some or all the operations of block 640 may be formed ahead of time and cached.

Process 600 may further include presenting one or more relevant advertisements at electronic billboard 130 (block 650). For instance, the one or more relevant advertisements may be transmitted, from advertisement database 170, to electronic billboard 130. Electronic billboard 130 may then present the advertisements, such as by displaying each advertisement for a particular period of time.

Figure 7:
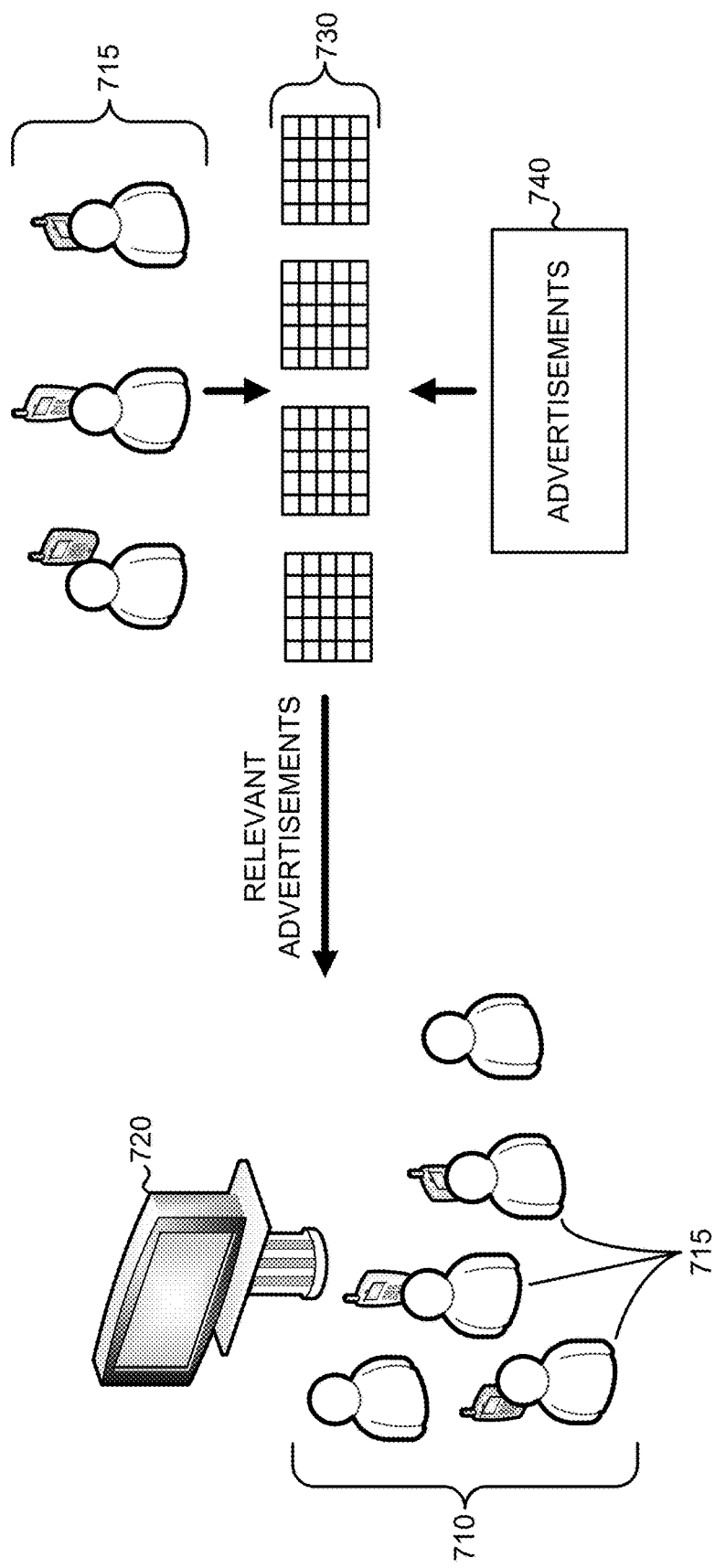
FIG. 7 is a diagram illustrating an example application of social affine targeting.

FIG. 7 is a diagram illustrating an example application of social affine targeting. As shown, assume that a number of users 710 are near an electronic billboard 720. Users 710 may represent, for instance, a group of random users that happened to be congregating around billboard 720 or a group of affiliated users, such as users in a tour group. Only some of users 710, labeled as users 715, may have mobile devices capable of transmitting location information (e.g., three of the five users 710 are shown as possessing mobile devices).

Situational content server 140 or situational analytics server 150 may detect the presence of users 715, and in response, may determine the current affinity groups for users 715. Four affinity groups 730 are particularly illustrated in FIG. 7. Affinity groups 730 may represent the current affinities of users 715, as determined by analysis of consensually shared behavior information of users 715. These four affinity groups 730 may be analyzed to determine commonality of the affinities between users 715. For example, a combined affinity group may be determined to represent the commonality between users 715. Advertisements 740, or category tags associated with advertisements 740, may be analyzed with respect to the commonality between users 715, as represented by affinity groups 730, to determine one or more advertisements that are particularly relevant to users 715. These advertisements may be transmitted to electronic billboard 720 for presentation to users 710.

As described above, users may be assigned affinity groups that represent the affinities of the users. The affinity groups assigned to a set of users congregating around an electronic billboard may be combined to find commonality among the set of users. Advertisements targeted to the commonality may then be presented.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIG. 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining, by a device, mobile devices that are in a vicinity of a physical electronic billboard, connected to the device via a network, based on presence information obtained by the mobile devices using global positioning system (GPS) logic or triangulation of cellular towers;
   determining, by the device, behavior information relating to the mobile devices,
      the behavior information including information regarding time spent in vicinity of the physical electronic billboard and history of responding to digital information;
   determining, by the device and based on the behavior information relating to the mobile devices, a first vector for the mobile devices that represents commonality of affinities corresponding to the mobile devices,
      the first vector including a plurality of cells that correspond to a plurality of categories, and
      when determining the first vector, one or more first mobile devices, of the mobile devices, are given more weight than one or more second mobile devices, of the mobile devices, that are associated with spending less time in vicinity of the physical electronic billboard, based on the time spent, than the one or more first mobile devices;
   determining, by the device and based on the behavior information relating to the mobile devices, a second vector for the mobile devices,
      when determining the second vector, one or more third mobile devices, of the mobile devices, are given more weight than one or more fourth mobile devices, of the mobile devices, that are associated with a different history, based on the history of responding, than the one or more third mobile devices;
   selecting, by the device, information to present by the physical electronic billboard based on one or more category tags and one or more of the first vector or the second vector,
      the one or more category tags corresponding to one or more categories of the plurality of categories; and
   transmitting, by the device and via the network, the selected information for display by the physical electronic billboard.

2. The method of claim 1, where determining the first vector includes:
   determining a plurality of affine groups; and
   combining the plurality of affine groups to obtain the first vector that represents the commonality of the affinities.

3. The method of claim 1, where the behavior information is consensually obtained information that is passively monitored.

4. The method of claim 1, further comprising:
   determining a third vector,
      where the selected information is selected further based on the third vector, and
      where, when determining the third vector, one or more fifth mobile devices, of the mobile devices, that are closer to the physical electronic billboard are given more weight than one or more sixth mobile devices, of the mobile devices, that are further away from the physical electronic billboard.

5. The method of claim 1, further comprising:
   receiving a registration message from the physical electronic billboard after the physical electronic billboard is powered on,
      the registration message including information regarding a geographic location of the physical electronic billboard and capabilities of the physical electronic billboard, and
      the capabilities including one or more of a size of a screen of the physical electronic billboard or a capability of the physical electronic billboard to produce audio,
      where determining the mobile devices that are in the vicinity of the physical electronic billboard includes:
         determining, based on receiving the registration message, the mobile devices that are in the vicinity of the physical electronic billboard.

6. The method of claim 1, where the presence information includes geographic locations of the mobile devices.

7. A non-transitory computer-readable medium storing instructions, the instructions comprising:
  one or more instructions that, when executed by one or more processors of one or more devices, cause the one or more processors to:
    determine, based on presence information received from mobile devices, the mobile devices in a vicinity of a content presentation device installed in a particular geographic location and connected to the one or more devices via a network;
    determine, based on behavior information relating to the mobile devices, affinities corresponding to the mobile devices,
      the behavior information including information regarding time spent in vicinity of the content presentation device and history of response to digital information;
    determine a first vector, for the mobile devices, that represents commonality of the affinities corresponding to the mobile devices,
      the first vector including a plurality of cells that correspond to a plurality of categories, and
      to determine the first vector, one or more first mobile devices, of the mobile devices, are given more weight than one or more second mobile devices, of the mobile devices, that are associated with spending less time in vicinity of the content presentation device, based on the time spent, than the one or more first mobile devices;
    determine a second vector, for the mobile devices, based on the behavior information relating to the mobile devices,
      to determine the second vector, one or more third mobile devices, of the mobile devices, are given more weight than one or more fourth mobile devices, of the mobile devices, that are associated with a different history, based on the history of response, than the one or more third mobile devices;
    select information to present via the content presentation device based on one or more category tags and one or more of the first vector or the second vector, the one or more category tags corresponding to one or more categories of the plurality of categories; and
    transmit, to the content presentation device and via the network, the selected information for display via the content presentation device.

8. The non-transitory computer-readable medium of claim 7, where the one or more instructions to determine the first vector include:
  one or more instructions that, when executed by the one or more processors of the one or more devices, cause the one or more processors to:
    determine a plurality of affine groups; and
    combine the plurality of affine groups to obtain the first vector that represents the commonality of the affinities.

9. The non-transitory computer-readable medium of claim 7, where the behavior information further includes consensually monitored information that relates to one or more of content viewing habits of a plurality of users of the mobile devices or purchase history of the plurality of users.

10. The non-transitory computer-readable medium of claim 7,
  where the instructions further comprise:
    one or more instructions that, when executed by the one or more processors of the one or more devices, cause the processors to:
      determine a third vector,
    where, to determine the third vector, one or more fifth mobile devices, of the mobile devices, that are closer to the content presentation device are given more weight than one or more sixth mobile devices, of the mobile devices that are further away from the content presentation device, and
    where the selected information is selected further based on the third vector.

11. The non-transitory computer-readable medium of claim 7,
  where the instructions further comprise:
    one or more instructions that, when executed by the one or more processors of the one or more devices, cause the processors to:
      receive a registration message from the content presentation device, and
    where the one or more instructions to determine the mobile devices include:
      one or more instructions that, when executed by the one or more processors of the one or more devices, cause the processors to:
        determine, based on receiving the registration message, the mobile devices in the vicinity of the content presentation device.

12. The non-transitory computer-readable medium of claim 7, where the presence information includes geographic locations of the mobile devices.

13. The non-transitory computer-readable medium of claim 7, where the selected information includes advertisements.

14. A system comprising:
  one or more server devices to:
    determine mobile devices that are in a vicinity of an electronic billboard connected to the one or more server devices via a network;
    determine a first vector that represents commonality of affinities corresponding to the mobile devices based on behavioral information relating to the mobile devices,
      the behavioral information including information regarding time spent in vicinity of the electronic billboard and history of response to digital information, and
      the first vector including a plurality of cells that correspond to a plurality of categories, and
      to determine the first vector, one or more first mobile devices, of the mobile devices, are given more weight than one or more second mobile devices, of the mobile devices, that are associated with spending less time in vicinity of the electronic billboard, based on the time spent, than the one or more first mobile devices;
    determine a second vector, for the mobile devices, based on the behavior information relating to the mobile devices,
      to determine the second vector, one or more third mobile devices, of the mobile devices, are given more weight than one or more fourth mobile devices, of the mobile devices, that are associated with a different history, based on the history of response, than the one or more third mobile devices;

select information to present by the electronic billboard based on category information and one or more of the first vector or the second vector, the category information including information corresponding to one or more categories of the plurality of categories; and instruct the electronic billboard, via the network, to present the selected information.

15. The system of claim 14, where, to determine the mobile devices that are in the vicinity of the electronic billboard, the one or more server devices are to:

determine the mobile devices that are in the vicinity of the electronic billboard based on presence information received from the mobile devices and a type of a location of the electronic billboard, the type of the location being in a store or outdoors.

16. The system of claim 14, where, when selecting the information, the one or more server devices are to:

select the information that is most relevant to a combined affinity group.

17. The system of claim 14, where the behavioral information further includes content viewing habits of a plurality of users of the mobile devices.

18. The system of claim 14, where a plurality of users, of the mobile devices, include first users and second users, where the affinities include:

first affinities of one or more fifth mobile devices of the mobile devices, and second affinities of one or more sixth mobile devices of the mobile devices, and where the one or more server devices are further to:

determine a third vector by giving more weight to the first affinities than the second affinities based on the one or more fifth mobile devices being physically closer to the electronic billboard than the one or more sixth mobile devices, and instruct the electronic billboard to present other information based on the third vector.

19. The system of claim 14, where the behavioral information further includes information regarding one or more roaming patterns of the mobile devices.

20. The system of claim 14, where the behavioral information further includes information regarding one or more web browsing histories of the mobile devices.

* * * * *